United States Patent [19]

Krambrock

[11] Patent Number: 5,397,062
[45] Date of Patent: Mar. 14, 1995

[54] DEVICE FOR SETTING A PRESCRIBED GAS QUANTITY

[75] Inventor: Wolfgang Krambrock, Vogt, Germany

[73] Assignee: Zeppelin Schuettguttechnik GmbH, Weingarten, Germany

[21] Appl. No.: 152,231

[22] Filed: Nov. 16, 1993

[30] Foreign Application Priority Data

Nov. 21, 1992 [DE] Germany .................... 42 39 241.1

[51] Int. Cl.⁶ ................ B05B 1/30; G05D 7/01; G05D 16/00
[52] U.S. Cl. ..................... 239/590; 239/455; 406/14; 406/24; 137/494; 251/212
[58] Field of Search .......... 239/455, 452, 451, 590, 239/590.5, 589; 406/14, 19, 24; 137/494; 251/212, 298; 138/45, 46

[56] References Cited

U.S. PATENT DOCUMENTS

| 120,120 | 10/1871 | Stewart | 239/455 |
|---|---|---|---|
| 497,903 | 5/1893 | Woodward | 239/455 |
| 2,625,008 | 1/1953 | Crook | 239/455 |
| 2,918,933 | 12/1959 | Boitnott . | |
| 3,045,705 | 7/1962 | Hausammann | 239/455 |
| 3,194,014 | 7/1965 | Wilson, Jr. | 239/455 |
| 3,226,768 | 1/1966 | von Zelewsky et al. | 239/455 |
| 4,092,999 | 6/1978 | Rubrich . | |

FOREIGN PATENT DOCUMENTS

| 499669 | 4/1979 | Australia . | |
|---|---|---|---|
| 2527803A1 | 12/1983 | France . | |
| 1890042 | 3/1964 | Germany . | |
| 1987447 | 3/1968 | Germany . | |
| 3012630A1 | 10/1980 | Germany . | |
| 3209378A1 | 9/1983 | Germany . | |
| 3644119 | 6/1988 | Germany | 406/14 |
| 638024 | 8/1983 | Switzerland . | |
| 658442 | 11/1986 | Switzerland | 406/14 |
| 326546 | 3/1930 | United Kingdom . | |
| 889337 | 2/1962 | United Kingdom | 239/455 |
| 904619 | 8/1962 | United Kingdom | 239/455 |
| 1003462 | 9/1965 | United Kingdom . | |
| 1360424 | 7/1974 | United Kingdom | 406/14 |

OTHER PUBLICATIONS

Patent Abstracts of Japan, vol. 11, No. 291 (P-618) 19 Sep. 1987 & JP-A-62,085,307 (Marcon Electronics Co. Ltd) 18 Apr. 1987.
Patent Abstracts of Japan, vol. 8, No. 28 (M-274) (1465) 7 Feb. 1984 & SP-A-58,185,964 (Nihon Kikaki Seisakusho K.K.) 29 Oct. 1983.
Soviet Patents Abstracts, Section PQ, Week 9218, 17 Jun. 1992, Derwent Publications Ltd., London, GB; Class Q66, AN 92-149007 & SU-A-1,665,151 (Fedorets N V) 23 Jul. 1991.
Soviet Patents Abstracts, Section PQ, Week 9103, 6 Mar. 1991, Derwent Publications, Ltd., London, GB; Class Q66 AN91-020082 & SU-A-1,562,574 (GULKO V I) 7 May 1990.
"Messen, Steuern und Regeln in der Chemischen Technik" Hengstenberg J.; vol. III, Springer-Verlag, Berlin 1981, pp. 141–147; (no translation).

*Primary Examiner*—Karen B. Merritt
*Attorney, Agent, or Firm*—Spencer, Frank & Schneider

[57] ABSTRACT

A device is proposed which has a nozzle, in particular constructed to resemble a Laval nozzle, as a control device for setting a prescribed fluid mass flow and in which for the purpose of varying the flowing gas quantity the nozzle cross section or the nozzle geometry can be variably set during operation.

6 Claims, 4 Drawing Sheets

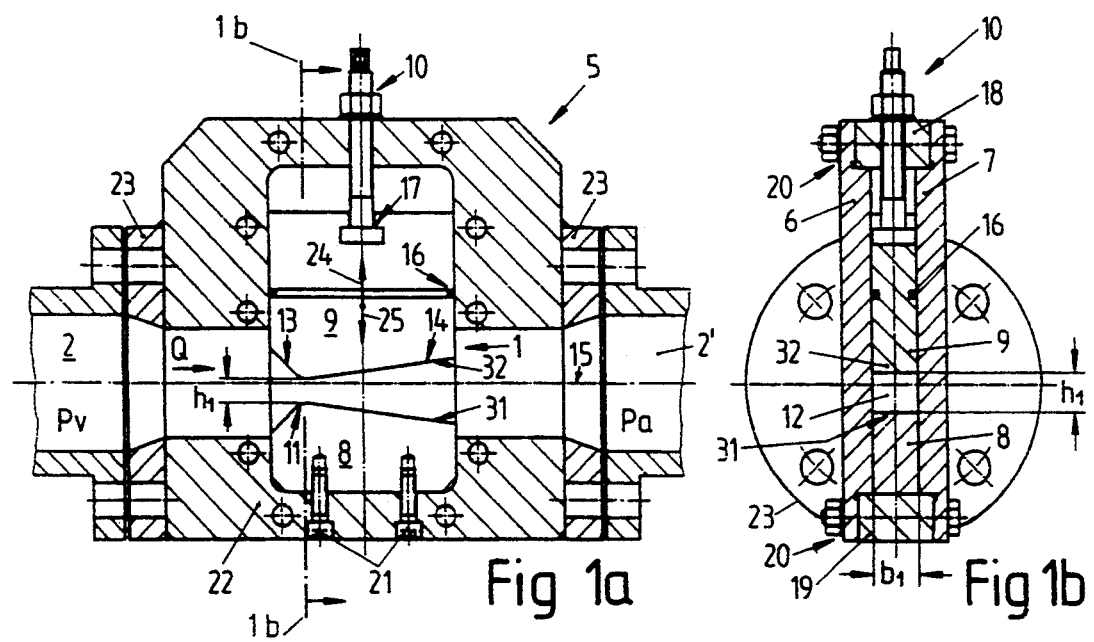
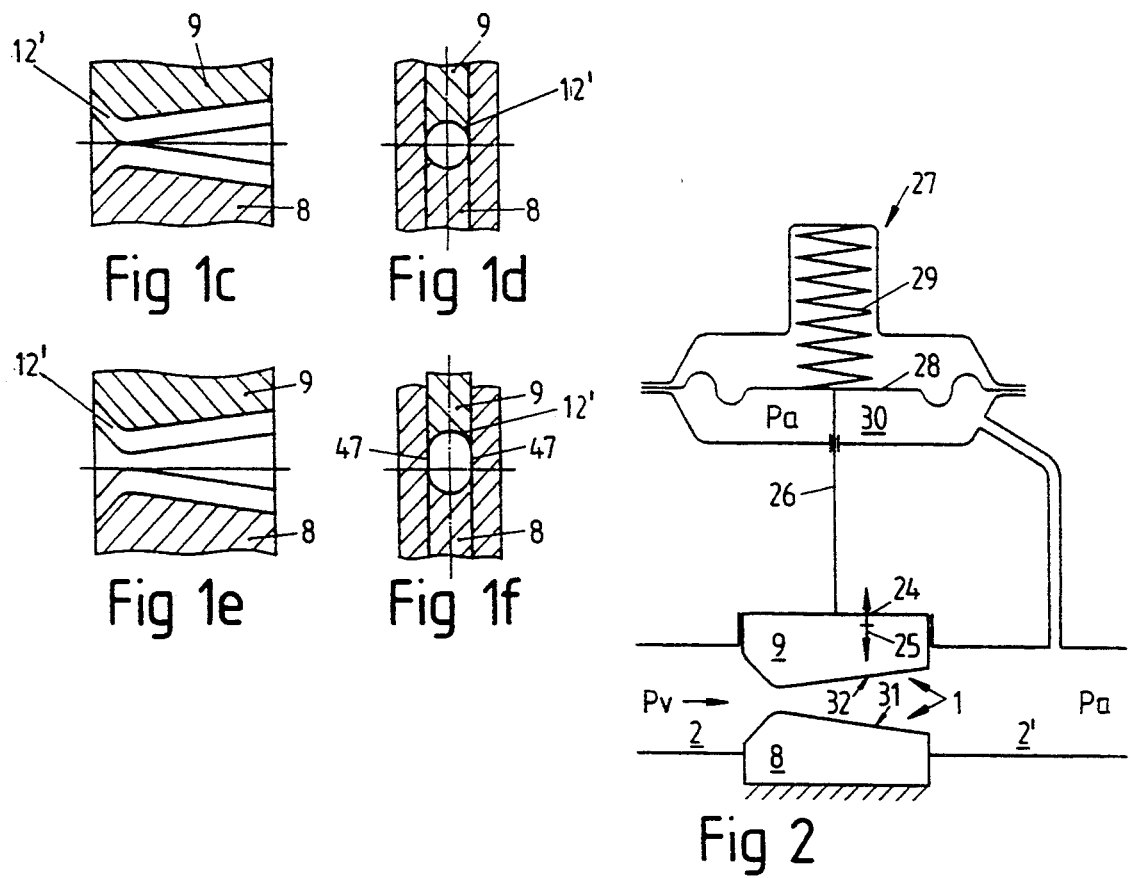

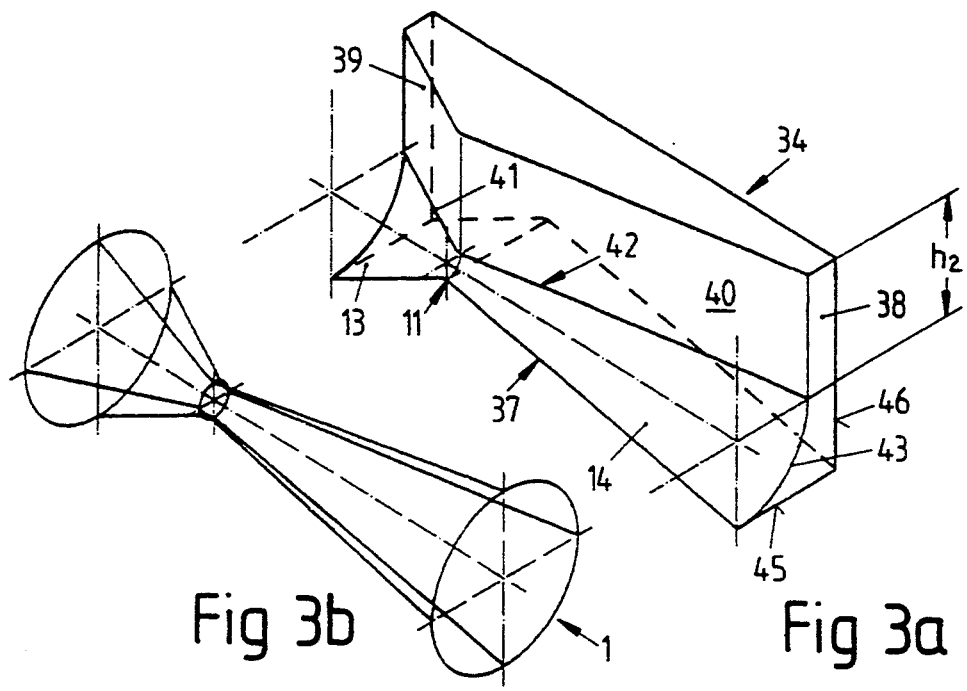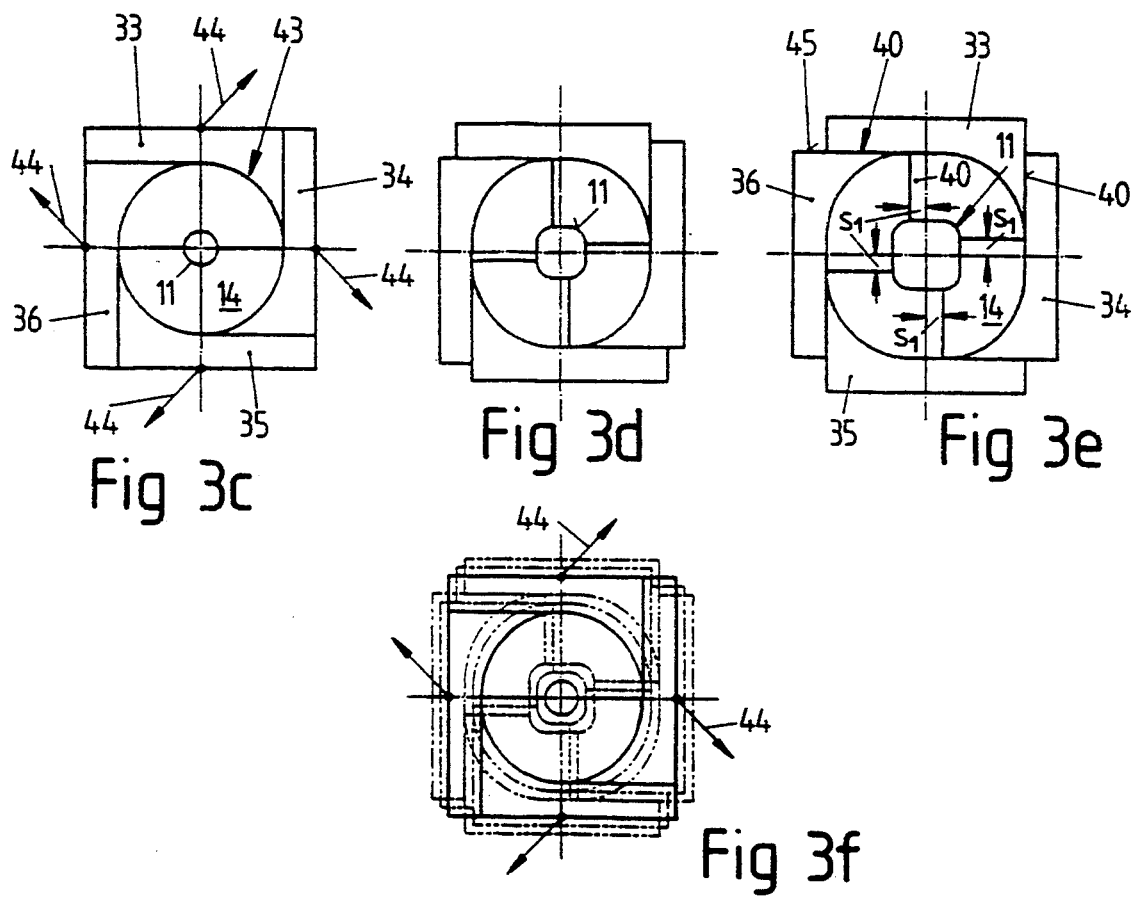

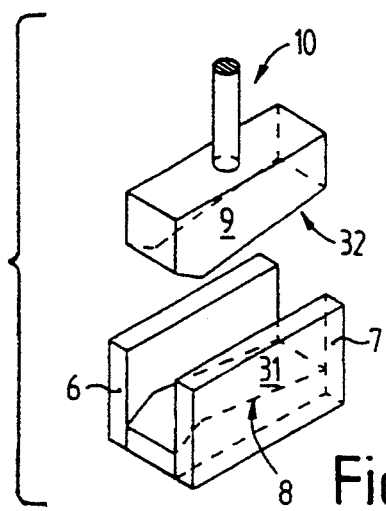
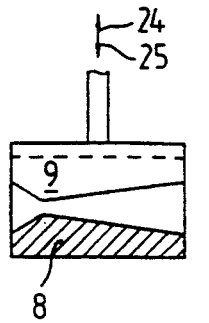
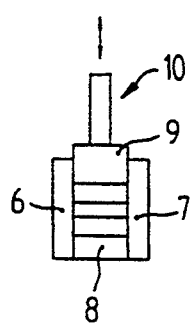
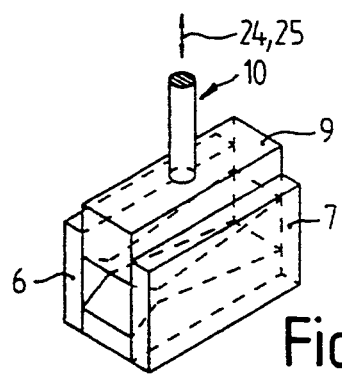
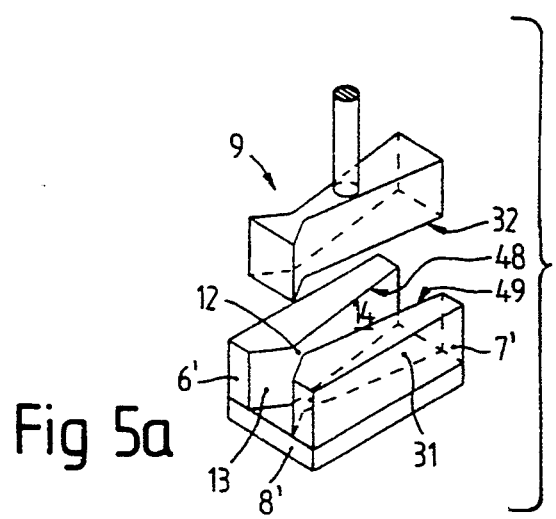
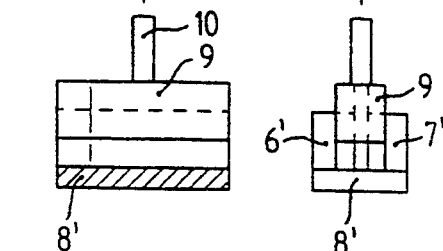
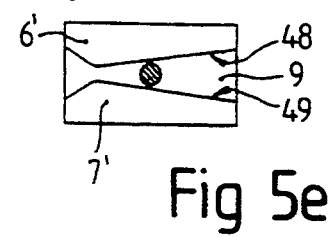
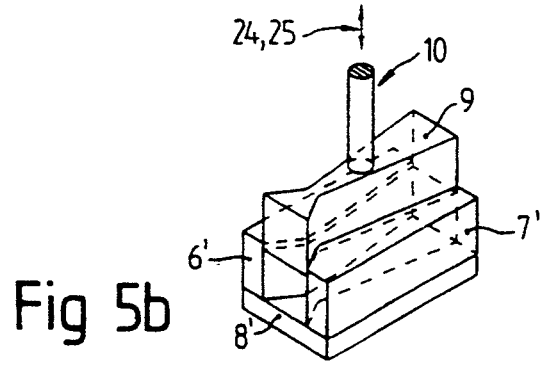

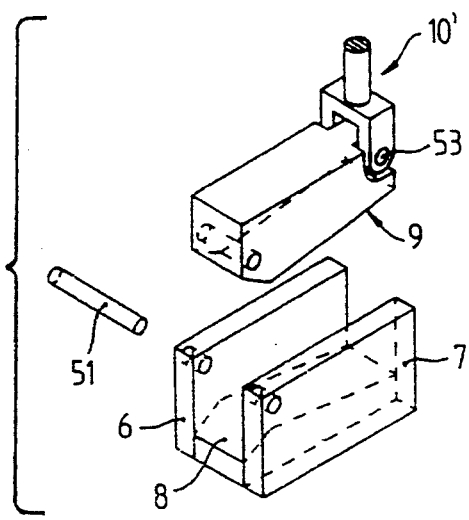
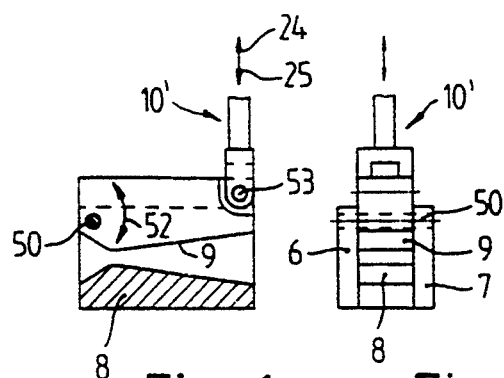
Fig 6c  Fig 6d
Fig 6a
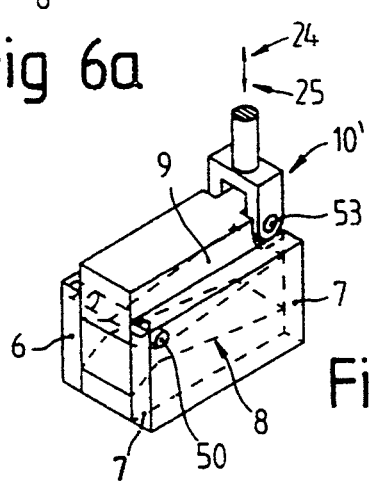
Fig 6b
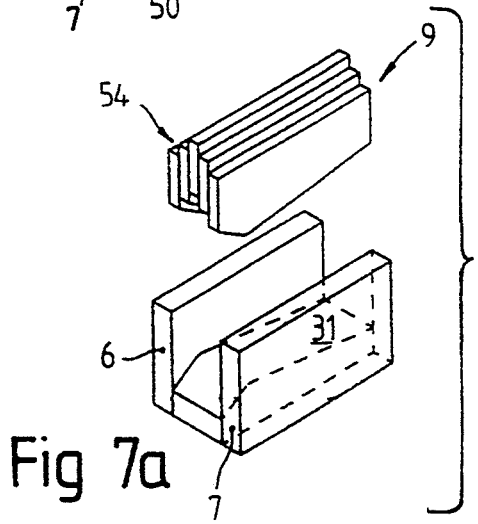
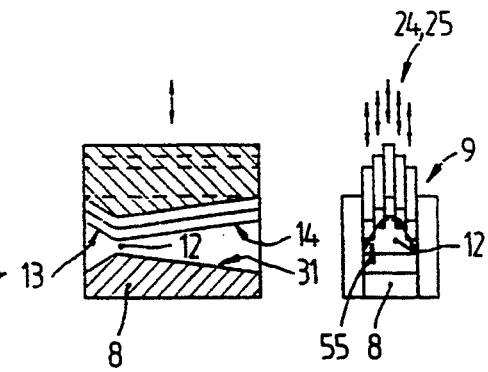
Fig 7c  Fig 7d
Fig 7a
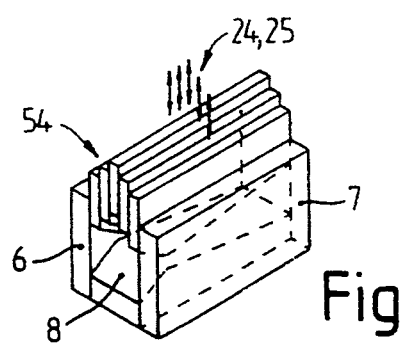
Fig 7b

DEVICE FOR SETTING A PRESCRIBED GAS QUANTITY

BACKGROUND OF THE INVENTION

The invention relates to a device including a nozzle as a control device for setting a prescribed fluid mass flow.

It is known that such control devices consist in the simplest case of a so-called naval nozzle, which expediently consists, in an axially symmetric fashion, of a convexly converging nozzle-shaped part and an adjoining concave expansion. Such naval nozzles deliver a constant gas mass flow as long as the ratio of the pressure in the narrowest part of the nozzle to the pressure upstream of the naval nozzle seen in the flow direction does not exceed the value of 0.53 (in the case of diatomic gases). It is possible by means of the pressure gained in the expanded part of the nozzle to keep the quantity of air constant given a constant inlet pressure if the ratio of the pressure prevailing at the end of the expansion to the inlet pressure of the naval nozzle does not exceed a value of 0.85 to 0.9, in round figures.

Such known naval nozzles have the disadvantage that the gas mass flow blowing through them can be varied only via the inlet pressure of the nozzle. Given a wide range of the gas quantity to be varied, it is frequently necessary for a plurality of naval nozzles, which deliver, optionally or in combination with one another, the necessary gas mass flow, to be connected in parallel.

SUMMARY OF THE INVENTION

An object of the invention is to provide a device resembling a naval nozzle in which the flowing gas quantity can be varied in conjunction with a constant nozzle inlet pressure as a function of an adjustable device or as a function of an arbitrary measured variable.

The above and other objects are achieved according to the invention by the provision of a device for pneumatic conveyance of bulk material, comprising: a housing having a nozzle integrated therein which functions as a control device for setting a prescribed quantity of gas passing through the nozzle for conveying bulk material in a fluid mass flow downstream of the nozzle, the nozzle being divided into at least two component segments at least one of which is movable for varying a cross-section of the nozzle; and a pressure-dependent adjustment device coupled to the at least one movable component segment and being responsive to a pressure downstream of the nozzle generated by a variation in the fluid mass flow for moving the at least one movable component segment to adjust the cross-section of the nozzle for changing the quantity of gas passing through the nozzle.

The object of the invention is to provide a nozzle in general, and in particular a device resembling a Laval nozzle, whose nozzle cross section or nozzle geometry can be variably adjusted during operation. This is performed in a particular embodiment of the invention, for example, by drawing a longitudinally sectioned nozzle apart between two lateral, flat walls. In particular, the shape of the nozzle cross section can be retained in longitudinal section by means of such a device.

A nozzle of varying cross section for producing a constant volumetric flow has been disclosed in U.S. Pat. No. 2,918,933. However, this is a conventional throttle valve whose cross section can be varied at the narrowest point of the passage by a slide acting as an orifice restrictor. By contrast, in the case of the present invention it is decisive that the shape of the overall nozzle cross section including the inlet and outlet diffuser is retained during the adjusting process.

In U.S. Pat. No. 4,092,999 printed publication, two sheet-metal strips which are mounted on a piston are to be deformed by an axial pressure such that the narrowest cross section of the nozzle is varied without, however, there being an adjustment in the expanded part of the nozzle. The present invention therefore also differs fundamentally from U.S. Pat. No. 4,092,999.

In an extension of the invention, the conical cross section of the structure of a nozzle assembled from subareas can be retained in its initial position, tangential wall sections which form flat side walls in the nozzle body being provided when a plurality of component segments of the nozzle are drawn apart. The nozzle thereby acts like a photographic lens, in which the diaphragm parts can be drawn apart radially in a tangentially overlapping manner.

It is also possible to select other shapes of the device resembling a Laval nozzle. Instead of two lateral, flat walls between which a cross section in the shape of a Laval nozzle is displaced, it is also possible for the device to be formed by opposing straight wall sections correspondingly arranged in the shape of a nozzle and having a plunger which can be correspondingly moved therebetween.

In a development of the invention, the operation of moving a nozzle part can be performed by a single-ended articulated connection, the freedom of movement of the nozzle arrangement remaining limited, of course, due to the stationary point of articulation.

The various nozzle shapes can be constructed in subareas as flat surfaces. However, they can also be given a three-dimensional structure by the production of individual segments, it being possible for the parallel individual segments to be moved separately.

It is advantageous that the change in the cross section of the nozzle can be set by means of a pressure-regulating device as a function of the nozzle outlet pressure.

A constant nozzle inlet pressure can be set in an advantageous way by means of a pressure-regulating valve.

Further details of the invention are represented in the drawings and explained in more detail in the following description, in which further advantages are specified.

BRIEF DESCRIPTION OF THE DRAWINGS

FIGS. 1a and 1b show a longitudinal section and a cross section, respectively, through a first embodiment for a nozzle according to the invention, having a rectangular cross section, FIG. 1c shows a partial axial section of the nozzle in FIG. 1 with the nozzle halves brought together to form a cone of revolution.

FIG. 1d shows a sectional view through the throat 12' of the nozzle in FIG. 1c.

FIG. 1e shows a partial axial section of the nozzle in FIG. 1 with the nozzle halves drawn apart to cause the shape of the nozzle to deviate from a cone of revolution.

FIG. 1f shows a sectional view through the throat 12' of the nozzle in FIG. 1e.

FIG. 2 shows a representation of the principle for the use of the nozzle according to the invention in control engineering.

FIG. 3a shows a perspective view of a nozzle segment according to another embodiment of the invention.

FIG. 3b is a schematic illustrating a nozzle having four segments of the type shown in FIG. 3a.

FIGS. 3c–3e are cross sectional schematics through the throat of a nozzle according to FIGS. 3a and 3b showing how the cross sectional shape of the throat changes as the position of the segments is changed.

FIG. 3f is a schematic showing an overlay of the three positions illustrated in FIGS. 3e to 3f.

FIG. 4a is an exploded view of another embodiment according to the invention.

FIG. 4b shows the embodiment of FIG. 4a with the movable nozzle segment inserted between the side walls of the nozzle.

FIG. 4c is a partial axial section of the embodiment of the nozzle in FIGS. 4a and 4b.

FIG. 4d is an end view of the nozzle embodiment of FIGS. 4a to 4c.

FIGS. 5a–5d show views corresponding to those of FIGS. 4a to 4d, respectively, with respect to yet another embodiment of the nozzle according to the invention.

FIG. 5e shows a top view of the nozzle embodiment of FIGS. 5a to 5d.

FIGS. 6a–6d show views corresponding to those of FIGS. 4a to 4d, respectively, with respect to yet another embodiment of the nozzle according to the invention.

FIGS. 7a–7d show views corresponding to those of FIGS. 4a to 4d, respectively, with respect to a further embodiment of the nozzle according to the invention.

DESCRIPTION OF EXEMPLARY EMBODIMENTS

The nozzle according to the invention is constructed as a Laval nozzle or a nozzle I resembling a Laval nozzle. The shape resembling a Laval nozzle will also be designated below as a "Laval nozzle". The "shape resembling a nozzle" arises from the ideal shape of a Laval nozzle, which does not exist in every position of the variable nozzle shape.

The present invention provides to vary the cross section of a Laval nozzle during operation. It is thereby accepted in the case of the exemplary embodiments according to the individual figures that, as the case may be, the ideal conical cross section of a Laval nozzle cannot be retained, with the result that a shape resembling a Laval nozzle is produced.

In accordance with the representation in FIGS. 1a and 1b, such a nozzle 1 resembling a Laval nozzle—termed a "Laval nozzle" below—is arranged in a housing 5 consisting of two lateral longitudinal plates 6, 7. Located between the longitudinal plates 6, 7 is a lower, stationary nozzle half 8 and a nozzle half 9 which can move to and fro, the distance of which relative to one another can be varied by means of a control device 10. The section 1b—1b through the narrowest point 11 of the nozzle cross section in FIG. 1a is represented in FIG. 1b. As may be seen from FIG. 1b, the passage cross section 12 at the narrowest point 11 of the two nozzle halves 8, 9 is constructed as a rectangular cross section with a height $h_1$ and a width $b_1$, that is to say the normal circular cross section of a Laval nozzle is given a simplified construction. For the rest, in the plane of the page represented in accordance with FIG. 1a, the lower and upper nozzle halves 8, 9 have a cross section which corresponds to a Laval nozzle, that is to say a front, tapering conical region 13 which ends after the narrowest point 11 in a rear, conical opened-out region 14. However, the wall sections 13, 14 are constructed as flat wall sections.

The upper, displaceable nozzle half 9 is arranged in a radially displaceable fashion with respect to the central axis 15 of the pipe, in order to be able to adjust the distance between the nozzle halves 8, 9. In this case, the upper nozzle half 9 is guided longitudinally in the housing 5 via seals 16. A tie-bolt 17 is connected to the upper nozzle half 9 and leads through the housing wall to the external manual or automatic control device 10.

The tubular conveyor line 2 has an inlet pressure $P_y$ upstream of the Laval nozzle 1 and an outlet pressure $P_a$ downstream of the Laval nozzle 1. Due to the displaceability of the upper nozzle half 9, the gas mass flow °Q can therefore be increased in conjunction with a constant inlet pressure $P_y$ by increasing the distance between the two nozzle halves 8, 9, and can be reduced by reducing the distance between the two nozzle halves 8, 9. This enables the gas mass flow °Q to be capable of infinite adjustment even in the case of a constant inlet pressure $P_y$.

In accordance with the representation of the invention in FIGS. 1a and 1b, the two longitudinal plates 6, 7 are fixed relative to one another in the upper and in the lower region by an upper cover plate 18 and a lower cover plate 19 via a bolted connection 20 in each case in such a way that the two nozzle halves 8, 9 are mounted therebetween. In this arrangement, the lower nozzle half 8 is held stationary by a bolted connection 21 in a corresponding housing cutout 22. A circular mounting flange 23 serves to mount the housing 5 in an adapted tubular conveyor line 2. This connection is indicated at the two lateral ends in FIG. 1a.

In the exemplary embodiment of the invention according to FIGS. 1a and 1b, the two nozzle halves 8, 9 have a character which merely resembles a Laval nozzle even in their narrowest position where they are brought together, since the two nozzle halves in each case have opposing flat nozzle walls 31, 32. This produces a square or rectangular passage cross section 12 in the narrowest passage cross section (FIG. 1b). In accordance with the representation in FIGS. 1c to 1f, this wall cross section 12' in the narrowest point brought together can also perfectly well be executed as a structure in the shape of a cone of revolution, in order to retain the character or the construction of a true Laval nozzle (FIGS. 1c and 1d). However, as soon as the upper and lower nozzle half are drawn apart (FIGS. 1e and 1f), additional flat side wall sections 47 are produced which cause the shape of the nozzle to deviate from a pure solid of revolution.

The principle of the Laval nozzle 1 in accordance with FIGS. 1a and 1b is represented once again in FIG. 2. For the purpose of forming a shape which at least resembles a Laval nozzle in cross section, the upper movable nozzle half 9 is opposite the lower fixed nozzle half 8. The up and down movement of the movable nozzle half 9 is represented by the arrows 24, 25 for the up and down movements.

The connection of the upper movable nozzle half 9 via a symbolically indicated draw rod 26 leads to a control device 27, which is represented as a control member by way of example. This control device can, for example, be constructed as a diaphragm controller, a movable diaphragm 28 being clamped between a compression spring 29 and a pressure chamber 30. The pressure chamber 30 is subjected to the output pressure $P_a$ in the conveyor line 2' downstream of the Laval nozzle 1, so that a pressure drop or a pressure build-up in the pressure $P_a$ downstream of the Laval nozzle 1 results in a displacement of the diaphragm 28 so as to adjust the level of the movable nozzle half 9. For example, a pressure build-up can be performed in a conveyor line 2' situated downstream with regard to the Laval nozzle 1 through the formation of a plug or through intensified feeding of bulk material that is to be conveyed. An increased pressure $P_a$ results in a pressure rise in the pressure chamber 30, so that the diaphragm 28 and thus the upper nozzle half 9 is raised (arrow direction 24). In this case, the passage cross section of the Laval nozzle 1 is increased, and this leads to an increased gas mass flow °Q.

The aim in the exemplary embodiment of the invention according to FIGS. 3a–ef is a further nozzle shape which is as far as possible rotationally symmetrical. In this case, the Laval-like nozzle 1 consists of, for example, four component segments 33 to 36 which are assembled in each case to form a Laval nozzle corresponding to the representations in FIGS. 3c to 3f. Here, each component segment 33 to 36 consists of one fourth of a three-dimensionally formed Laval nozzle, marked in FIG. 3a with the reference symbol 37. In particular, in each case a quarter of an inlet region 13 in the shape of a cone of revolution and a quarter of an outlet region 14 in the shape of a cone of revolution is provided as a component segment having a narrowest point 11 for forming a true Laval nozzle in cross section after the four components 33 to 36 they have been assembled. A wall section 38 is drawn up tangentially on a side wall of each component segment 33 to 36, and has two flat side faces 39, 40 which tangentially adjoin the end of the side lines 41, 42 of the inlet region 13 and of the outlet region 14. The height $h_2$ of these integrally formed lateral and flat side walls 39, 40 is determined in accordance with the dimension of the cross section of the Laval nozzle to be opened.

As may be gathered from the representation according to FIGS. 3c to 3f, the four component segments 33 to 36 are assembled in an annular fashion adjoining one another, so that the four parts form a closed rotationally symmetrical nozzle shape 37 of a Laval nozzle 1, as is represented in FIG. 3c. A rotationally symmetrical body is present in this closed assembled shape, that is to say there is a true Laval nozzle respectively having a circular cross section, in particular also at the narrowest point 11. The rear end of the nozzle shape is denoted by 43.

If, now, the four component segments 33 to 36 are drawn apart along the arrows 44 in an oblique direction (45°), the nozzle-shaped cross section opens up like a lathe jaw chuck of a photographic lens by sliding along the respective parts on the flat side faces 39, 40, external, flat adapted outer faces 45, 46 being provided on the component segments 33 to 36. In a manner similar to that in FIGS. 1c and 1d, flat component wall sections 39, 40, which are denoted in the position according to FIG. 3e by a width $s_1$ are added to the rotationally symmetrical nozzle shape 37. Opening the Laval nozzle, that is to say increasing the cross section of the Laval nozzle, is therefore achieved by adding flat side wall sections of the side walls 39, 40 of all the component segments 33 to 36. FIG. 3c shows the closed position without added wall sections. FIGS. 3d and 3e show a slightly opened and more widely opened position of the nozzle with an increased cross section viewed from such a nozzle situated downstream. The various positions from FIGS. 3c–3e are illustrated by broken lines in FIG. 3f.

Of course, it is also possible to use more than four component segments 33 to 36 to form the nozzle shape, an increased number effecting a closer approximation to a circular shape by the formation of a polygonal curve.

FIGS. 4a–4d, 5a–5e, 6a–6d and 7a–7d again show a diagrammatic representation of various cross-sectional shapes for forming a nozzle resembling a Laval nozzle.

FIGS. 4a to 4d again represent the nozzle shape in accordance with FIGS. 1a and 1b in representation and mode of operation shown in principle. Identical parts are provided with identical reference symbols. This case is again one of flat nozzle walls 31, 32 of the two nozzle halves 8, 9, the upper nozzle half 9 being moved up and down between straight lateral walls 6, 7 by means of a control device 10 (arrows 24, 25).

The representation according to FIG. 4a shows the upper nozzle part, which is raised from the lower part and brought together with the lower part in FIG. 4b. FIG. 4c shows a side view of the mutually opposing lower and upper nozzle halves 8, 9 with the cross section resembling a Laval nozzle in cross section, and FIG. 4d shows a front view of the nozzle arrangement.

In a representation analogous to FIGS. 4a–4d, FIGS. 5a–5e reproduces an alternative nozzle shape by means of the individual representations according to FIGS. 5a to 5e. Instead of the straight and flat side walls 6, 7 in FIGS. 1a and 1b, respectively, as well as in FIGS. 4a–4d, in accordance with the exploded representation in FIGS. 5a–5e, the exemplary embodiment according to FIG. 5 has two stationary side walls 6', 7', which do not have a flat inner face as in the case of the exemplary embodiment according to FIGS. 4a–4d, but an inner face 48, 49 profiled according to the type of a Laval nozzle. These stationary faces 48, 49 correspond to the flat nozzle walls 31, 32 in the previously described exemplary embodiment according to FIGS. 1a and 1b and to FIGS. 4a–4d with the difference that these remain at a constant distance from one another. The side walls 6', 7' therefore already form a contour resembling a Laval nozzle.

The lower, fixed nozzle half 8' can also have a contour 31 resembling a Laval nozzle in a manner corresponding to the exemplary embodiment according to FIGS. 1a and 1b, or according to FIG. 4. In a simplified embodiment, the lower nozzle half 8' can, however, also be constructed as a flat plate, since the side walls 6', 7', are, after all, already profiled in a manner resembling a Laval nozzle. Such a flat plate 8' is represented in lateral section as the lower nozzle part in FIG. 5c.

The upper nozzle half 9 now consequently has in top view a cross section likewise resembling a Laval nozzle and which is inserted between the side walls 6', 7' in the shape of a nozzle half. The upper nozzle half 9 is represented in FIG. 5a separately above the side walls 6', 7'. The nozzle half 9, which in top view resembles a Laval nozzle in cross section, is inserted in FIG. 5b via a symbolically represented control device 10 (arrows 24, 25) between the individual wall sections 6', 7' formed in the shape of a nozzle. The lower face of the movable upper nozzle half 9 can, in turn, be constructed flat or else as a face 32 profiled in the shape of a nozzle, as was described with reference to the lower nozzle section 8'.

The two nozzle halves 8', 9 are constructed in FIGS. 5c to 5e with opposing flat faces. FIG. 5e shows a top view of the two profiled side wall sections 6', 7' with the likewise profiled nozzle half 9 inserted from above.

The exemplary embodiment according to FIGS. 6a–6d represents a modification of the embodiment according to FIGS. 4a–4d. Identical parts are denoted, once again, by identical reference symbols. Instead of a linear up and down movement of the upper nozzle half 9 in FIGS. 4a and 4b, respectively, by means of a linearly acting control device 10, in the case of the exemplary embodiment according to FIG. 6 the upper nozzle half 9 performs a pivoting movement about a horizontal axis 50 of rotation which is formed by a bolt 51 which is placed in the front region of the upper nozzle half 9 and leads to a pivoting movement (arrow 52) about this axis of rotation. Located, in turn, in a rear region of the upper nozzle half 9 is a control device 10' which is pivoted via an articulation 53 to the nozzle half 9. The up and down movement of the control device 10' is represented, in turn, by the arrows 24, 25. Instead of the linear up and down movement of the exemplary embodiment according to FIGS. 4a–4d, in the case of the exemplary embodiment according to FIGS. 6a–6d there is therefore a pivoting movement about the axis 50 of rotation. In this case, the entire cross section of the device resembling a Laval nozzle is opened or closed.

In the exemplary embodiment according to FIGS. 1c and 1f, respectively, the two nozzle halves 8, 9 have mutually opposing face sections which are constructed in a rotationally symmetrical fashion so as to produce in the brought-together state according to FIGS. 1c and 1d a rotationally symmetrical nozzle cross section without lateral flat wall sections. In the exemplary embodiment according to FIGS. 7a–7d, the upper nozzle half 9 is now produced from a multiplicity of segment plates 54 which can be arranged displaceably with respect to one another and at different levels inside the housing. For example, FIG. 7a shows an upper nozzle half 9 which consists of five individual segment plates which in accordance with the representation according to FIG. 7d (end view) and FIG. 7c (side view) are moved upwards differently. From this, the inner passage cross section 12, 13, 14 can, to the extent that it relates to the upper nozzle half 9, be constructed as a polygonal semicircle 55 which therefore approximately corresponds to the shape of the exemplary embodiment according to FIGS. 1c to 1f. The multiplicity of the arrows 24, 25 illustrated indicates that each segment plate can be displaced to a different extent with respect to the others, in order to achieve an arbitrary inner contour of the passage cross section 12, 13, 14 in conjunction with the upper nozzle half 9. The lower nozzle half 8 is constructed in this case as in the previously described exemplary embodiments according to FIGS. 4a–4d or FIGS. 6a–6d, that is to say in this case an outer contour resembling a Laval nozzle with a flat nozzle wall face 31 is involved. Of course, the lower nozzle wall face 31 could also be correspondingly segmented and variously displaced in order to obtain a corresponding shape, as is described in relation to the upper nozzle half 9 in FIGS. 7a–7d.

The invention is not restricted to the exemplary embodiments described and represented. Rather, it embraces all configurations known to the person skilled in the art within the scope of the basic concept of the invention according to the claims.

I claim:

1. A device for pneumatic conveyance of bulk material, comprising:

a housing having a nozzle integrated therein which functions as a control device for setting a prescribed quantity of gas passing through the nozzle for conveying bulk material in a fluid mass flow downstream of the nozzle, said nozzle being divided into at least two component segments at least one of which is movable for varying a cross-section of the nozzle, said housing including two parallel, spaced-apart longitudinal plates between which two of said component segments are located, wherein one of said two component segments comprises a fixed nozzle half and has a nozzle profile, and the other one of said two component segments comprises a movable nozzle half which is movably guided in the space between said plates and has a profile that is a mirror image of the profile of said fixed nozzle half; and a pressure-dependent adjustment device coupled to said movable nozzle half and being responsive to a pressure downstream of said nozzle generated by a variation in the fluid mass flow for moving said movable nozzle half to adjust the cross-section of said nozzle for changing the quantity of gas passing through the nozzle.

2. The device as claimed in claim 1, wherein the movable nozzle half has a front region with a pivoting axis and a rear region coupled to the pressure dependent adjustment device for carrying out a pivoting movement with respect to said fixed nozzle half.

3. The device as claimed in claim 1, wherein said plates of said housing include two fixed, parallel and spaced-apart side walls having opposing inner flat faces each of which has a nozzle contour, and said movable nozzle half constitutes an upper nozzle half disposed between said two walls and having side surfaces each shaped correspondingly with the nozzle contour of a respective one of said two walls so that said movable nozzle half can move up and down between said two side walls.

4. The device as claimed in claim 1, wherein said two nozzle halves, when moved close to one another, form at least partially a cross section having a shape of a cone of revolution.

5. The device as claimed in claim 1, wherein said movable nozzle half is comprised of a plurality of individual segments which are arranged displaceably relative to one another for varying a contour of said nozzle.

6. A device for pneumatic conveyance of bulk material, comprising:

a housing having a nozzle integrated therein which functions as a control device for setting a prescribed quantity of gas passing through the nozzle for conveying bulk material in a fluid mass flow downstream of the nozzle, said nozzle being divided into at least three component segments each of which has a three dimensional nozzle contour with conical wall sections and a tangentially continuing flat wall section, wherein said at least three component segments are arranged to be displaced outwardly and inwardly along said flat wall sections for varying the cross-section of said nozzle; and a pressure-dependent adjustment device coupled to said at least three component segments and being responsive to a pressure downstream of said nozzle generated by a variation in the fluid mass flow for moving said at least three component segments to adjust the cross-section of said nozzle for changing the quantity of gas passing through the nozzle.

* * * * *